(12) United States Patent
Subramaniam et al.

(10) Patent No.: US 9,853,717 B2
(45) Date of Patent: Dec. 26, 2017

(54) HALF-DUPLEX COMMUNICATIONS FOR A VERY SMALL APERTURE TERMINAL (VSAT) OPERATING ON A CONTINUOUS STREAM

(71) Applicants: Bala Subramaniam, Potomac, MD (US); Matt Butehorn, Bethesda, MD (US)

(72) Inventors: Bala Subramaniam, Potomac, MD (US); Matt Butehorn, Bethesda, MD (US)

(73) Assignee: Hughes Network Systems, L.L.C., Germantown, MD (US)

( * ) Notice: Subject to any disclaimer, the term of this patent is extended or adjusted under 35 U.S.C. 154(b) by 0 days.

(21) Appl. No.: 15/164,644

(22) Filed: May 25, 2016

(65) Prior Publication Data

US 2016/0352415 A1 Dec. 1, 2016

Related U.S. Application Data

(60) Provisional application No. 62/168,866, filed on May 31, 2015.

(51) Int. Cl.
*H04B 1/38* (2015.01)
*H04B 7/185* (2006.01)
(Continued)

(52) U.S. Cl.
CPC ..... *H04B 7/18528* (2013.01); *H04B 7/18517* (2013.01); *H04B 7/18578* (2013.01);
(Continued)

(58) Field of Classification Search
CPC ............ H04B 7/18513; H04B 7/18519; H04B 7/18573; H04B 7/18528; H04B 7/18578;
(Continued)

(56) References Cited

U.S. PATENT DOCUMENTS 8,208,421 B2 * 6/2012 Dankberg .......... H04B 7/18582
370/310

8,780,823 B1 * 7/2014 Sebastian ................ H04W 4/18
370/248

(Continued)

FOREIGN PATENT DOCUMENTS

| EP | 1030464 B1 | 2/2002 |
|---|---|---|
| WO | 8906883 A1 | 7/1989 |
| WO | 0057580 A1 | 9/2000 |

OTHER PUBLICATIONS

International Search Report for International Application No. PCT/US2016/034144.

(Continued)

*Primary Examiner* — Khanh C Tran
(74) *Attorney, Agent, or Firm* — Capitol City TechLaw; Jasbir Singh

(57) ABSTRACT

A method and apparatus for providing half-duplex communications for a Very Small Aperture Terminal (VSAT) operating on a continuous received stream is disclosed. The method includes: decoding the continuous received stream to establish synchronization with the continuous received stream; locating, in the continuous received stream, a time plan including a receiving timeslot and a transmitting timeslot; demodulating the continuous received stream by adapting to a timing and frequency variation of the continuous received stream in the receiving timeslot, freewheeling the adapting of the continuous received stream during the transmitting timeslot, and resuming the adapting of the continuous received stream when the transmitting timeslot ends; stopping a receiving of the continuous received stream during the transmitting timeslot; and transmitting from the VSAT during the transmitting timeslot. The freewheeling includes saving a signal acquisition parameter at the start of the transmitting timeslot and restoring the saved signal acquisition parameter at the end of the transmitting timeslot.

34 Claims, 5 Drawing Sheets

(51) Int. Cl.
*H04L 5/00* (2006.01)
*H04L 5/14* (2006.01)
*H04B 7/212* (2006.01)

(52) U.S. Cl.
CPC ......... *H04B 7/2125* (2013.01); *H04L 5/0048* (2013.01); *H04L 5/1453* (2013.01)

(58) Field of Classification Search
CPC .............. H04B 7/2125; H04B 7/18517; H04B 7/18582; H04B 7/2041; H04L 47/522; H04L 5/0048; H04L 5/1453; H04W 84/06; H04W 88/04; H04W 74/002
See application file for complete search history.

(56) References Cited

U.S. PATENT DOCUMENTS

| | | |
|---|---|---|
| 9,026,042 B1 | 5/2015 | Nemeth et al. |
| 2002/0105976 A1 | 8/2002 | Kelly et al. |
| 2003/0073435 A1* | 4/2003 | Thompson ......... H04B 7/18513 455/428 |
| 2004/0029545 A1 | 2/2004 | Anderson et al. |
| 2004/0120273 A1 | 6/2004 | Border et al. |
| 2006/0251121 A1 | 11/2006 | Vacanti |
| 2007/0218931 A1 | 9/2007 | Beadle et al. |
| 2007/0248931 A1 | 10/2007 | Wong et al. |
| 2008/0043663 A1* | 2/2008 | Youssefzadeh .... H04B 7/18528 370/321 |
| 2011/0268158 A1* | 11/2011 | Miller .................. H04B 7/2041 375/138 |
| 2012/0294384 A1 | 11/2012 | Wilcoxson et al. |
| 2013/0051311 A1* | 2/2013 | Hieb .................. H04B 7/2123 370/326 |
| 2013/0136004 A1 | 5/2013 | Torres et al. |
| 2015/0312838 A1 | 10/2015 | Torres et al. |

OTHER PUBLICATIONS

Results of Partial International Search for International Application No. PCT/US2016/034174.

* cited by examiner

HALF-DUPLEX COMMUNICATIONS FOR A VERY SMALL APERTURE TERMINAL (VSAT) OPERATING ON A CONTINUOUS STREAM

CROSS REFERENCE TO RELATED APPLICATIONS

The present application claims the benefit of U.S. Provisional Application No. 62/168,866, filed May 31, 2015, which is incorporated in its entirety by reference for all purposes as if fully set forth herein.

FIELD

The present disclosure relates to a method and a system for providing half-duplex communications for a Very Small Aperture Terminal (VSAT) operating on a continuous stream. In particular, the present disclosure provides for half-duplex mode when a forward link of the communication operates on a continuous stream, and the demodulator timing and frequency recovery of the forward link are being continuously updated based on incoming samples.

BACKGROUND

The Digital Video Broadcasting System version 2 (DVB-S2) standard describes a Very Small Aperture Terminal (VSAT) providing a continuous forward link for a full-duplex terminal wherein the receiver is always in the receive mode. The continuous forward link uses Adaptive Coding and Modulation (ACM) that provides for frames of varying length. The demodulator relies on successful reception of a frame's Physical Layer Signaling (PLS) header to determine the length of the current frame and sets up the aperture window to look for the next frame's header. As the continuous forward link uses a receiver that is always receiving, a half-duplex terminal is not supported without loss of capacity and/or packet loss.

SUMMARY

This Summary is provided to introduce a selection of concepts in a simplified form that is further described below in the Detailed Description. This Summary is not intended to identify key features or essential features of the claimed subject matter, nor is its intent to limit the scope of the claimed subject matter.

A method for providing half-duplex communications for a Very Small Aperture Terminal (VSAT) operating on a continuous received stream is disclosed. The method includes: decoding the continuous received stream to establish synchronization with the continuous received stream; locating, in the continuous received stream, a time plan including a receiving timeslot and a transmitting timeslot; demodulating the continuous received stream by adapting to a timing and frequency variation of the continuous received stream in the receiving timeslot, freewheeling the adapting of the continuous received stream during the transmitting timeslot, and resuming the adapting of the continuous received stream when the transmitting timeslot ends; stopping a receiving of the continuous received stream during the transmitting timeslot; and transmitting from the VSAT during the transmitting timeslot. The freewheeling includes saving a signal acquisition parameter at the start of the transmitting timeslot and restoring the saved signal acquisition parameter at the end of the transmitting timeslot.

An apparatus to provide half-duplex communications for a Very Small Aperture Terminal (VSAT) operating on a continuous received stream is disclosed. The apparatus includes: a decoder configured to decode the continuous received stream to establish synchronization with the continuous received stream, and configured to locate, in the continuous received stream, a time plan including a receiving timeslot and a transmitting timeslot; a demodulator configured to demodulate the continuous received stream by adapting to a timing and frequency variation of the continuous received stream in the receiving timeslot, freewheeling the adapting of the continuous received stream during the transmitting timeslot, and resuming the adapting of the continuous received stream when the transmitting timeslot ends; a receiver configured to stop receiving the continuous received stream during the transmitting timeslot; and a transmitter configured to transmit from the VSAT during the transmitting timeslot, wherein freewheeling includes saving a signal acquisition parameter at the start of the transmitting timeslot and restoring the saved signal acquisition parameter at the end of the transmitting timeslot.

A method for receiving half-duplex communications from a Very Small Aperture Terminal (VSAT) operating on a continuous received stream is disclosed. The method includes: receiving, from the VSAT, a request for allocating a transmitting timeslot, wherein the request includes a priority and a modulation scheme; allocating bandwidth based on the request with an allocation including the transmitting timeslot, wherein the allocating assigns the transmitting timeslot based on the priority and the modulation scheme of the request and adds the transmitting timeslot to a blacklist; generating a time plan based on priority, modulation scheme and blacklist; transmitting the allocation to the VSAT; and transmitting the time plan to the VSAT, wherein the time plan include a transmitting timeslot and an associated modulation for the VSAT, and a receiving timeslot for the VSAT.

A gateway for receiving half-duplex communications from a Very Small Aperture Terminal (VSAT) operating on a continuous received stream is disclosed. The gateway includes: a receiver configured to receive, from the VSAT, a request for allocating a transmitting timeslot, wherein the request includes a priority and a modulation scheme; a bandwidth allocator configured to allocate bandwidth based on the request with an allocation including the transmitting timeslot, wherein the bandwidth allocator assigns the transmitting timeslot based on the priority and the modulation scheme of the request to generate a time plan; and a transmitter configured to transmit the allocation and the time plan to the VSAT, wherein the time plan includes a transmitting timeslot and an associated modulation for the VSAT, and a receiving timeslot for the VSAT.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIG. 1 illustrates a communications system including a terminal operating in half-duplex mode with non-constant coding and modulation according to various embodiments.

DETAILED DESCRIPTION

Figure 1:
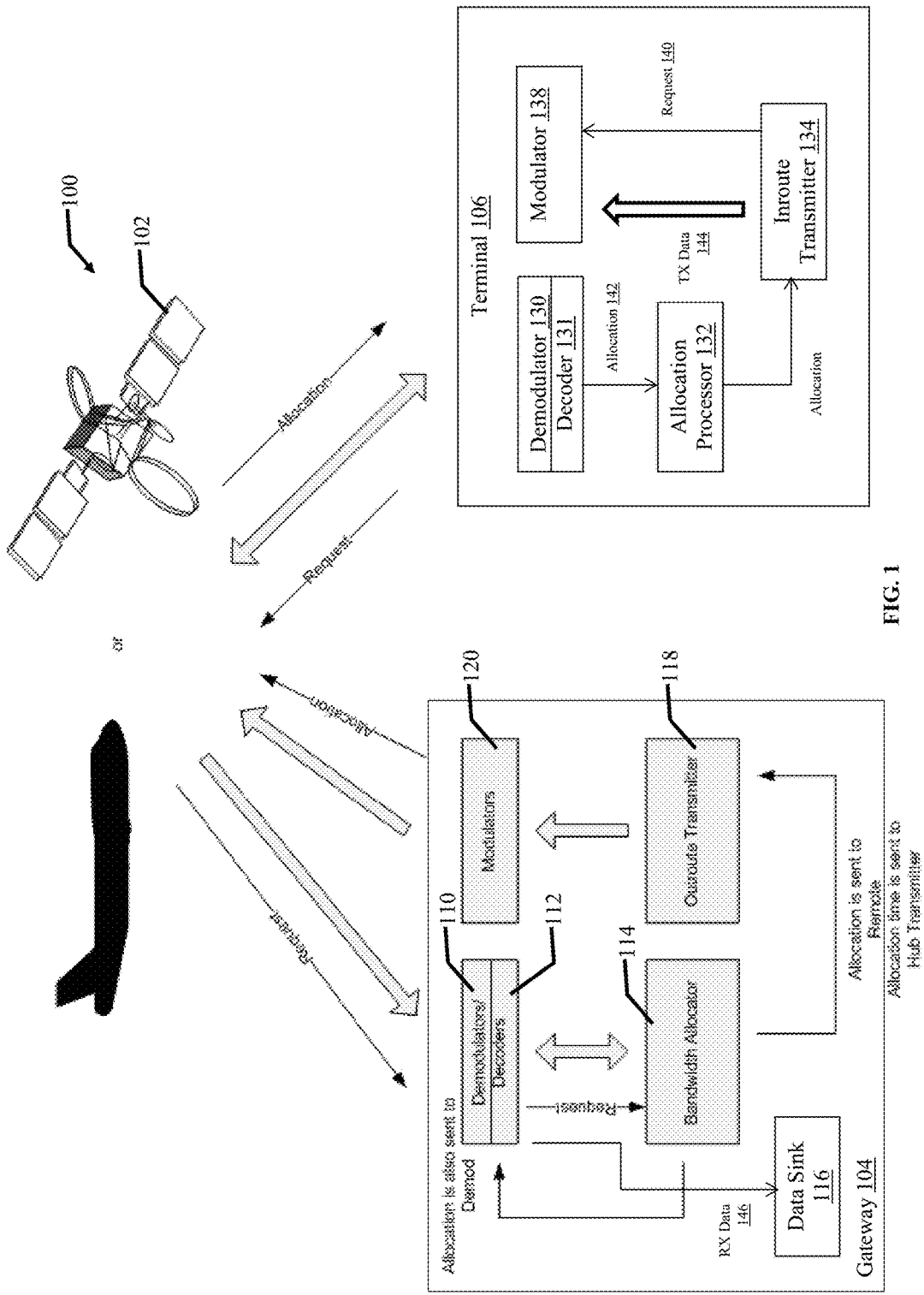

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

The terminology used herein is for describing particular embodiments only and is not intended to be limiting of the present disclosure. As used herein, the singular forms "a," "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first," "second," and the like does not imply any particular order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

A Very Small Aperture Terminal (VSAT) is a two-way satellite ground station or a stabilized maritime VSAT antenna with a dish antenna that is smaller than 3 meters. The parabolic shape of the dish has special reflective properties that enable it to concentrate and focus signals to a single point, i.e., the focal point. The dish receives and transmits signals, after reflecting and concentrating them, from and to satellites. VSATs may be used to transmit narrowband data (point of sale transactions, such as, credit card, polling or RFID data; or SCADA), or broadband data (for the provision of Satellite Internet access to remote locations, VoIP or video). VSATs may also be used for transportable, on-the-move (utilizing phased array antennas) or mobile maritime communications. Very Small Aperture Terminal (VSAT) remote terminals may be used to communicate data, voice and video, between a remote site location and a satellite hub. In exemplary embodiments, a VSAT can include a router/gateway functionality therein. The VSAT router/gateway functionality can route IP datagrams between a space link and a standard network interface, for example, an Ethernet interface, a Wi-Fi interface, and the like.

The satellite hub provides a hub terminal; including an outdoor transceiver and antenna, indoor integrated modem and multiplexing systems, a single-cable inter-facility link, and a variety of network interfaces that may simultaneously deliver traffic to a network backbone; for example, in TDM, ATM, and IP formats. Sectors may be provisioned for 1:N (e.g., N=4) active redundancy. In exemplary embodiments, the satellite hub can include a router/gateway functionality therein. The satellite hub router/gateway functionality can route IP datagrams between a space link and a standard network interface, for example, a network backbone, an Ethernet interface, a Wi-Fi interface, and the like.

Overview

In certain applications, it is beneficial to operate the Very Small Aperture Terminal (VSAT) in a half-duplex mode. In the case of the half duplex radio, the Radio Frequency (RF) equipment cannot transmit and receive simultaneously, and then the VSAT operates in half-duplex mode. The present disclosure describes how to efficiently operate a VSAT in half-duplex mode in a system where the forward link from the VSAT is a continuous stream.

When operating in half duplex mode, a demodulator in the VSAT stops receive mode and the VSAT switches to transmit mode. In transmit mode, the demodulator loose timing synchronization on a continuous forward stream as the VSAT has stopped receiving (as it is in receive mode). The continuous forward stream includes a stream that uses a non-constant coding and modulation, for example, a Digital Video Broadcasting System version 2 (DVB-S2) standard scheme using Adaptive Coding and Modulation (ACM). In half-duplex mode, the VSAT is not aware of the location of the next frame to be received when it switches from the transmit mode to the receive mode, as the VSAT did not receive the Physical Layer Signaling (PLS) header in transmit mode.

To recover, a demodulator in the VSAT has to go through a re-acquisition process to re-establish synchronization and start receiving valid bursts. This acquisition process could take tens's of frames during which the terminal is not able to communicate and result in capacity loss. The re-acquisition requires the demodulator to establish timing and frequency synchronization.

The present disclosure provides a method for a receiver to re-acquire synchronization rapidly and transition from transmit mode to receive mode with little or no capacity loss. The present disclosure provides a unique acquisition method in ACM Mode. According to various embodiments, the ACM re-acquisition may be done in one frame. The one frame reacquisition is similar to the Constant Coding and Modulation (CCM) reacquisition time.

According to various embodiments, a last known frequency estimation may be used to improve the re-acquisition time by reducing the number of frames to re-acquire timing and re-establish frame synchronization with, for example, a demodulator. In some embodiments, a frame time plan, for example, an ACM Time plan, may be broadcast to terminals and repeated over a Super Frame for a terminal to re-acquire timing and frequency synchronization within one frame.

According to various embodiments, the method provides for outroute scheduling of packets. The outroute scheduling can: ensure that no data loss occurs when a half-duplex terminal is transmitting frames, describe how asynchronous transmissions from the terminal occur, provide for unicast transmissions to the terminal without data loss, and provide for sending of packets to multiple terminals simultaneously (multicast) without data loss. In exemplary embodiments, the outroute scheduling may be provided by an Inroute Group Manager (IGM) or a VSAT Bandwidth Scheduler, known as IGM. The IGM may communicate with a Satellite Gateway Modulator (SGM) or Hub Transmitter in order to synchronize transmissions, so as to prevent data loss. In ACM Mode, a demodulator in the VSAT may provide multiple modes of operation.

FIG. 1 illustrates a communication system including a terminal operating in half-duplex mode with non-constant coding and modulation, according to various embodiments.

A communication system 100 may include a satellite 102, a gateway 104 and a terminal 106. In exemplary embodiments, the satellite 102 can be replaced by a High Altitude Platform (HAP). The gateway 104 may include a transceiver (not shown), a demodulator 110, a decoder 112, a bandwidth allocator 114, a data sink 116, an outroute transmitter 118, and a modulator 120. The terminal 106 may include a demodulator 130, a decoder 131, an allocation processor 132, an inroute transmitter 134 and a modulator 138.

A module/unit of the terminal 106 may generate a request 140 to obtain transmission bandwidth. The request 140 is transmitted to the satellite 102 via the inroute transmitter 134. The satellite 102 forwards the request 140 to the gateway 104. At the gateway 104, the request 140 can be decoded by the demodulator 110 and subsequently demodulated by the decoder 112. The request 140 may be provided to the bandwidth allocator 114. To satisfy the request 140, the bandwidth allocator 114 allocates a time slot for transmission by the gateway 104 as an allocation 142. The allocation 142 may satisfy some or all of the bandwidth requested by the request 140. At the gateway 104, the allocation 142 may be provided by the bandwidth allocator 114 to the outroute transmitter 118. The outroute transmitter 118 transmits the allocation 142 to the terminal 106. Transmission of the allocation 142 to the terminal 106 may use a time slot that is reserved only for transmission from the gateway 104 to the terminal 106. Transmission of the allocation 142 to the terminal 106 may be multicast or unicast to the terminal 106.

In exemplary embodiments, the allocation 142 may be transmitted in a super frame header of a continuous stream. In exemplary embodiments, the allocation 142 may include a terminal identifier, a frame and a slot number. In exemplary embodiments, the allocation 142 may be used to generate a time plan included in a super frame header as provided in the PLS layer. Bandwidth allocator 114 may generate the time plan. In exemplary embodiments, the identified terminal in the allocation 142 may switch to a transmission mode and transmit data during a timeslot per the allocation 142. In exemplary embodiments, the bandwidth allocator 114 ensures that the identified terminal is not scheduled to receive a transmission during the allocated time slot.

The allocation 142 is received at the terminal 106 by a transceiver (not shown) in receive mode. The allocation 142 is forwarded to the allocation processor 132 and the inroute transmitter 134. The inroute transmitter 132 may switch the transceiver to a transmission mode and transmit TX data 144 to the gateway 104 via the satellite 102 in the allocated time slot. At the gateway 104, the demodulator 110 and the decoder 112 can demodulate and decode the TX data 144 to provide RX data 146 to a data sink 116 at the gateway 104.

According to various embodiments, the gateway 104 can operate in full-duplex mode while the terminal 106 operates in half-duplex mode. In some embodiments, the gateway 104 can operate in half-duplex mode while the terminal 106 operates in full-duplex mode.

According to various embodiments, the request 140 may include information about the data to be transmitted by the terminal. The request information may include, for example, a priority, length, destination or the like, of the data to be transmitted. In some embodiments, the request 140 may include an Aloha request, for example, per the Internet Protocol over Satellite (IPOS) standard.

According to various embodiments, the teachings of the present disclosure improve reacquisition times for a continuous stream utilizing a constant modulation stream (such as, CCM mode stream) or a non-constant modulation mode stream (such as, ACM mode stream). For an ACM mode stream, two embodiments for operation of the demodulators are provided.

Embodiment for a Half-Duplex Terminal Demodulating in CCM Mode

In CCM mode, the gateway 104 transmits data on a single frame type (modulation and coding). In CCM mode, the demodulator 110 and 130 follow the same procedure. The terminal 106 is aware of or provided the time slot, or frame size and location of the next frame's PLS header. At the exit of RX at the terminal 106, the demodulator 130 stops adaptation of its loops. The demodulator 130 freezes signal acquisition parameters such as Automatic Gain Control (AGC), amplitude and phase imbalance, and equalizer coefficients. A reference oscillator correction is frozen and an oscillator (not shown) in the terminal 106 remains at the last known correction. The demodulator 130 is set to freewheel during the transmit allocation or transmit time slot, and the demodulator 130 maintains lock status as the frame timing is constant and known when operating CCM Mode. On transition from TX to RX mode, the demodulator 130 reacquires the RX stream from the gateway 104 within one (1) frame and starts to receive data.

Embodiment 1 for a Half-Duplex Terminal Demodulating in ACM Mode

According to various embodiments, in ACM mode, the gateway 104 transmits data on different frame types in a time plan and the demodulator 130 in the terminal 106 is not able to maintain lock status on transmissions from the gateway 104 by freewheeling during the terminal's transmit period. At the exit of RX mode or on transition to TX mode, the demodulator 130 stops adaptation of its loops. The demodulator 130 may freeze signal acquisition parameters, such as, Automatic Gain Control (AGC), amplitude and phase imbalance, equalizer coefficients, and reference oscillator correction. During the Transmit period, the demodulator 130 may freeze the frequency correction that was applied to receive data from the gateway 104.

On transition from TX to RX mode, the demodulator 140 may disable the frequency estimation function during reacquisition and restore the signal acquisition parameters. For example, the last known frequency correction instead may be applied to incoming data by the demodulator 130. As such, only the timing synchronization needs to be established by the demodulator 130 and the reacquisition may take 3 to 5 frames to complete versus 10 to 15 frames needed by the prior art. As a system can include thousands of terminals communicating with the gateway, a reduction to 3 to 5 frames to reacquisition increases system capacity. In some embodiments, to prevent capacity loss, the gateway 104 may co-ordinate the scheduling of traffic data to the terminal 106. During a time period necessary for reacquisition of transmission signal of a particular terminal 106, the gateway 104 can transmit traffic data to another terminal.

Embodiment 2 for a Half-Duplex Terminal Demodulating in ACM Mode

According to various embodiments, the DVB-S2 frames contain a frame number as part of the SSN field of the baseband header of the DVB-S2 frame. A fixed number of these DVB-S2 frames constitute a super frame. In some embodiments, the ACM Time plan of the super frame is transmitted to the terminal 106. When the gateway 104 services a plurality of terminals 106, the ACM Time plan is transmitted to all of the plurality of terminals. The super frame time duration can possibly change for a new ACM Time plan. In some embodiments, the ACM Time plan is based on the allocation 142.

At start-up, per the DVB-S2 standard, the demodulator 130 demodulates and the decoder 131 decodes the incoming frames to recover the frame SSN number present in the baseband header. A super frame boundary occurs whenever the SSN number rolls over. The decoder 131 keeps track of the SSN number and outputs a super frame boundary marker. The super frame boundary marker is made available to the Physical Layer Signaling (PLS) frame header processor of the demodulator 130.

The ACM time plan is made available to both the demodulator 130 and the decoder 131. The frame header processor of the demodulator 130 may determine the location of the PLS frame header using the super frame boundary marker and the ACM super frame. When the terminal 106 transitions from Receive (RX) to Transmit Mode (TX), the demodulator 130 stops adaptation of the timing and synchronization algorithms. The demodulator 130 freezes the parameters such as Automatic Gain Control (AGC), amplitude and phase imbalance, and equalizer coefficients. The demodulator 130 may maintain an oscillator correction to the last known value. During the TX mode, the demodulator 130 is set to freewheel and keep track of the elapsed time. On transition to RX mode, the demodulator 130 may reacquire within one (1) frame the RX signal, as the location of the next frame header is known from the super frame boundary marker and the fixed ACM Time plan.

The gateway (or hub or gateway hub) 104 can periodically change the ACM Time plan by broadcasting the ACM Time plan to all terminals during a specified time period. The ACM Time plan is sent by the gateway 104 using, for example, the multi-cast frames located at the beginning of the super frame.

Outroute Bandwidth Scheduling

When packets are received by an outroute transmitter 118 at the gateway 104 for transmission over the satellite 102, the packets may be ordered by code rate as well as priority. In order to accommodate the half-duplex nature of the VSAT/terminal 106, the outroute transmitter 118 (i.e., SGM) receives updates from the bandwidth allocator 114 (i.e., IGM) that indicates when VSATs are scheduled to transmit on the inroute in time. If the VSAT 106 is scheduled to transmit, the bandwidth allocator 114 bypasses the VSAT 106 in the priority/modulation coder queue until the transmit time is over. In some embodiments, the bypassed data is placed on a look aside list for later processing. Data that has been bypassed may be handled first (at the highest priority) when the transmit time period is over.

Fixed Opportunity TX/RX

When the VSAT 106 has need to transmit, and has no outstanding allocations, the VSAT 106 may transmit a request 140, for example, by using an Aloha burst opportunity, in an unscheduled open transmission time. Since the request transmit opportunities are unscheduled to a particular VSAT, in other words, open to all VSATs in the system, the unscheduled open transmission time is known by the gateway 104 in a half-duplex system, so that no data is transmitted to any of the VSATs during the unscheduled open transmission time.

Likewise, there are a number of system messages that are transmitted to all VSATs in a system, and the bandwidth allocator 114 does not allocate VSAT TX timeslots during all system broadcast timeslots. The broadcast information may be relayed, according to various embodiments.

Fixed Opportunity TX/RX Embodiment 1

According to various embodiments, as part of the allocation updates that are sent by the bandwidth allocator 114, the bandwidth allocator 114 sends when the request/aloha slots are scheduled to the outroute transmitter 118. The outroute transmitter 118 may transmit nulls during these periods. Likewise, a time slot may be configured in the bandwidth allocator 114 where the bandwidth allocator 114 is not allowed to place any transmission opportunities (scheduled to a particular VSAT or open). While this may waste bandwidth, it limits the opportunities for data loss.

Fixed Opportunity TX/RX Embodiment 2

After a VSAT 106 has received an allocation from the bandwidth allocator 114, the VSAT 106 may receive periodic bandwidth for some time, even when the VSAT has no backlog of data to transmit. The VSAT 106 will receive this bandwidth while the VSAT 106 is active. When the VSAT 106 has nothing more to send, the VSAT 106 may be declared inactive after a small period of time, and must use a request 140 or Aloha burst to become active again. According to various embodiments, the outroute transmitter 118 may monitor how often the VSAT 106 is receiving bandwidth allocations, and determine whether the VSAT 106 is active or inactive. According to various embodiments, In order to make use of the bandwidth during Aloha transmission opportunities, the bandwidth allocator 114 may schedule outroute transmissions for any VSAT that is active during Aloha transmission opportunities.

Figure 2:
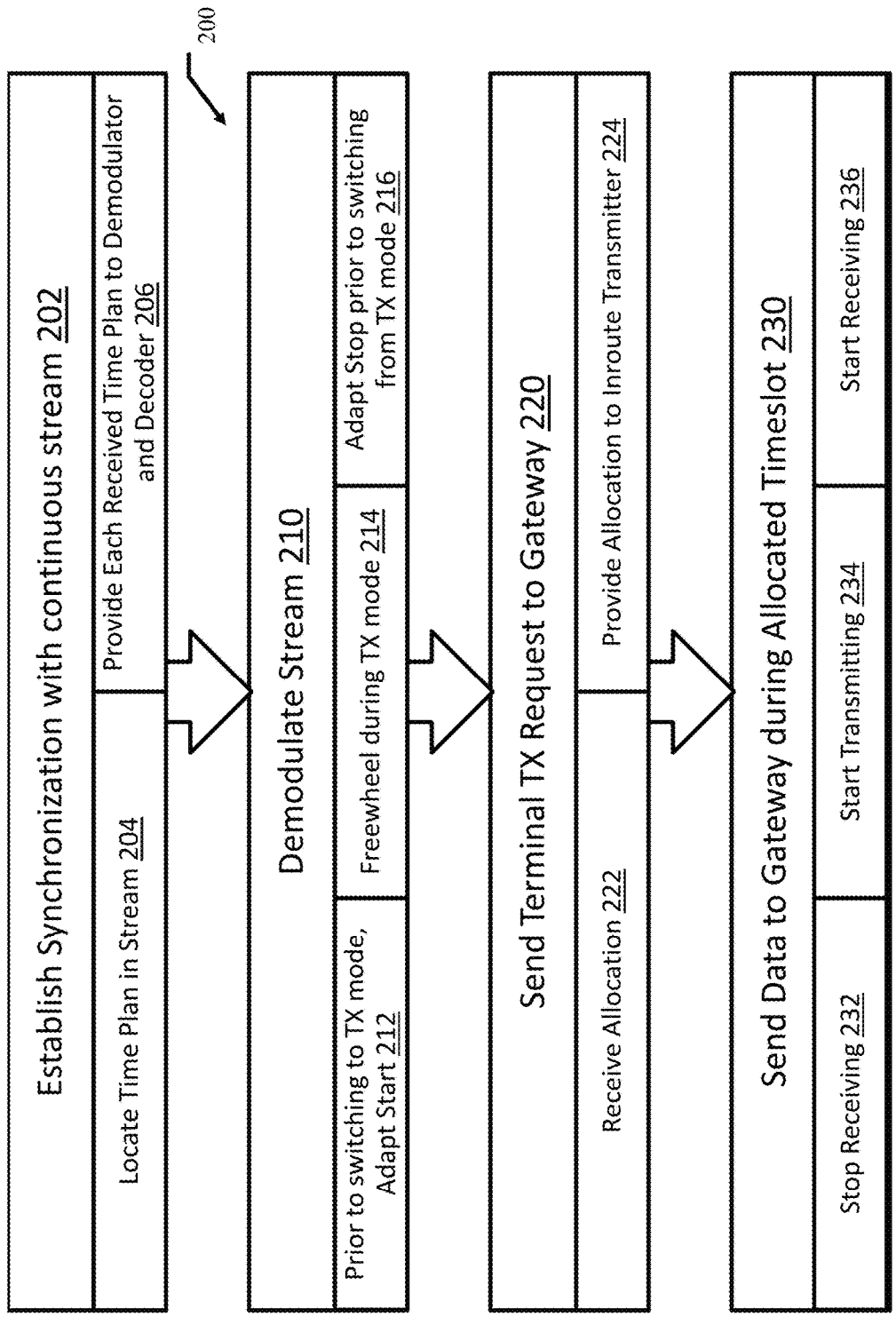
FIG. 2 is a flowchart of an exemplary method that may be implemented on a VSAT for an embodiment of the invention.

FIG. 2 is a flowchart of an exemplary method that may be implemented on a VSAT for an embodiment of the invention.

According to various embodiments, a method 200 may be provided at a VSAT to implement half-duplex communications for a Very Small Aperture Terminal (VSAT) operating on a continuous received stream. Method 200 includes operation 202 to establish synchronization with the continuous stream and operation 204 to locate time plan in stream. The method 200 includes operation 206 to provide each received time plan to a demodulator and a decoder.

The method 200 includes operation 210 to demodulate the stream. The demodulate stream operation 210 may include operation 212 to perform an adapt start on the stream prior to switching to TX mode. The demodulate stream operation 210 may include operation 214 to freewheel during TX mode. The freewheeling can include saving one or more signal synchronization parameters. The freewheeling can include counting clock cycles to determine an end of a timeslot, for example, a transmitting timeslot, a receiving timeslot and the like. The demodulate stream operation 210 may include operation 216 to perform an adapt stop prior to switching from TX mode.

According to various embodiments, the method 200 can include operation 220 to send terminal TX request to a gateway. The gateway can process and send an allocation to the VSAT. At the VSAT, the method 200 can include an operation 222 to receive the allocation. The allocation can be received in a frame slot of a super frame that is different than a super frame in which the request is sent to the gateway. A time plan that provides bandwidth for the allocation can be received in a frame slot of a super frame that is different than a super frame in which the request is sent to the gateway. According to various embodiments, the super frame of the request, the super frame of the allocation, and the super frame that provides a time plan fulfilling the allocation can all be super frames that are different from one another.

The method 200 can include operation 230 to send data or packets to a gateway during the allocated or transmitting timeslot. Operation 230 can include operation 232 to stop receiving the stream by turning off the receiver in a half-duplex transceiver. Operation 230 can include operation 234 to start transmitting the data or packet by switching the half-duplex transceiver into transmission mode and enabling the transmitter. Operation 230 can include operation 236 to start receiving the stream by turning off the transmitter and enabling the receiver in a half-duplex transceiver.

Figure 3:
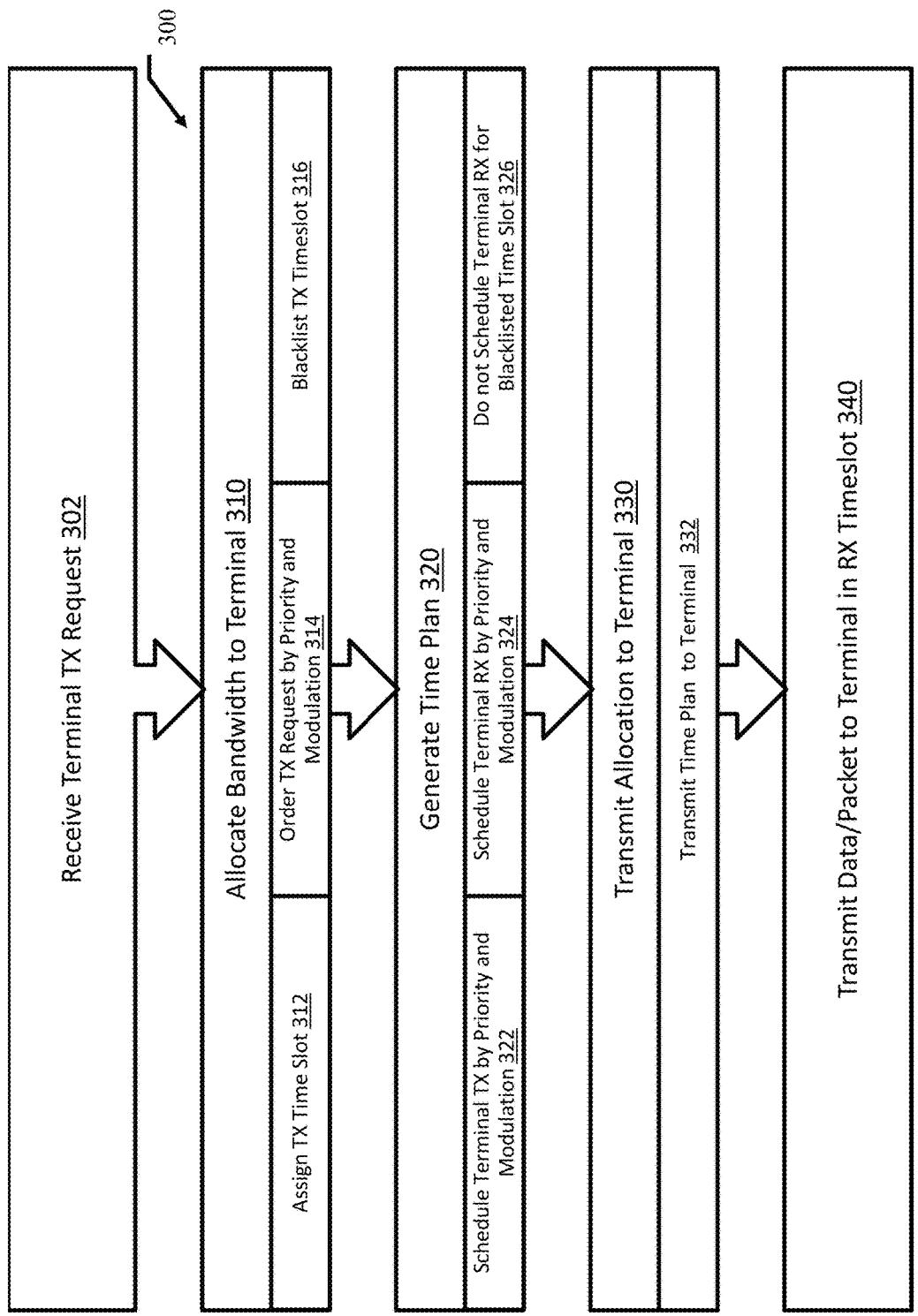
FIG. 3 is a flowchart of an exemplary method that may be implemented on a gateway for an embodiment of the invention.

FIG. 3 is a flowchart of an exemplary method that may be implemented on a gateway for an embodiment of the invention.

According to various embodiments, a method 300 may be provided for a gateway to implement half-duplex communications for a Very Small Aperture Terminal (VSAT) operating on a continuous received stream. Method 300 includes operation 302 to receive a terminal's TX request. The gateway can perform operation 310 to allocate bandwidth to the terminal. Method 300 can include operation 312 to assign a TX timeslot in response to the TX request from the terminal. Method 300 can include operation 314 to order TX requests by priority and modulation. For example, by ordering TX requests, highest priority data/packets can be grouped by their respective modulation type. The grouping by modulation can increase system capacity.

According to various embodiments, the TX timeslots, i.e., timeslots reserved for transmission from the terminal to the gateway, can be placed on a list in operation 316 to blacklist the TX timeslot with respect to reception by the terminal. The method 300 can include operation 320 to generate a time plan. The generated time plan can: schedule terminal TX by priority and modulation per operation 322; schedule terminal RX by priority and modulation per operation 324; and not schedule terminal RX for a blacklisted time slot per operation 326.

In exemplary embodiments, the method 300 can include operation 330 to transmit the allocation to the terminal. The method 300 can include operation 332 to transmit the time plan to the terminal. The method 300 can include operation 340 to transmit data/packet to the terminal in an RX timeslot.

Figure 4:
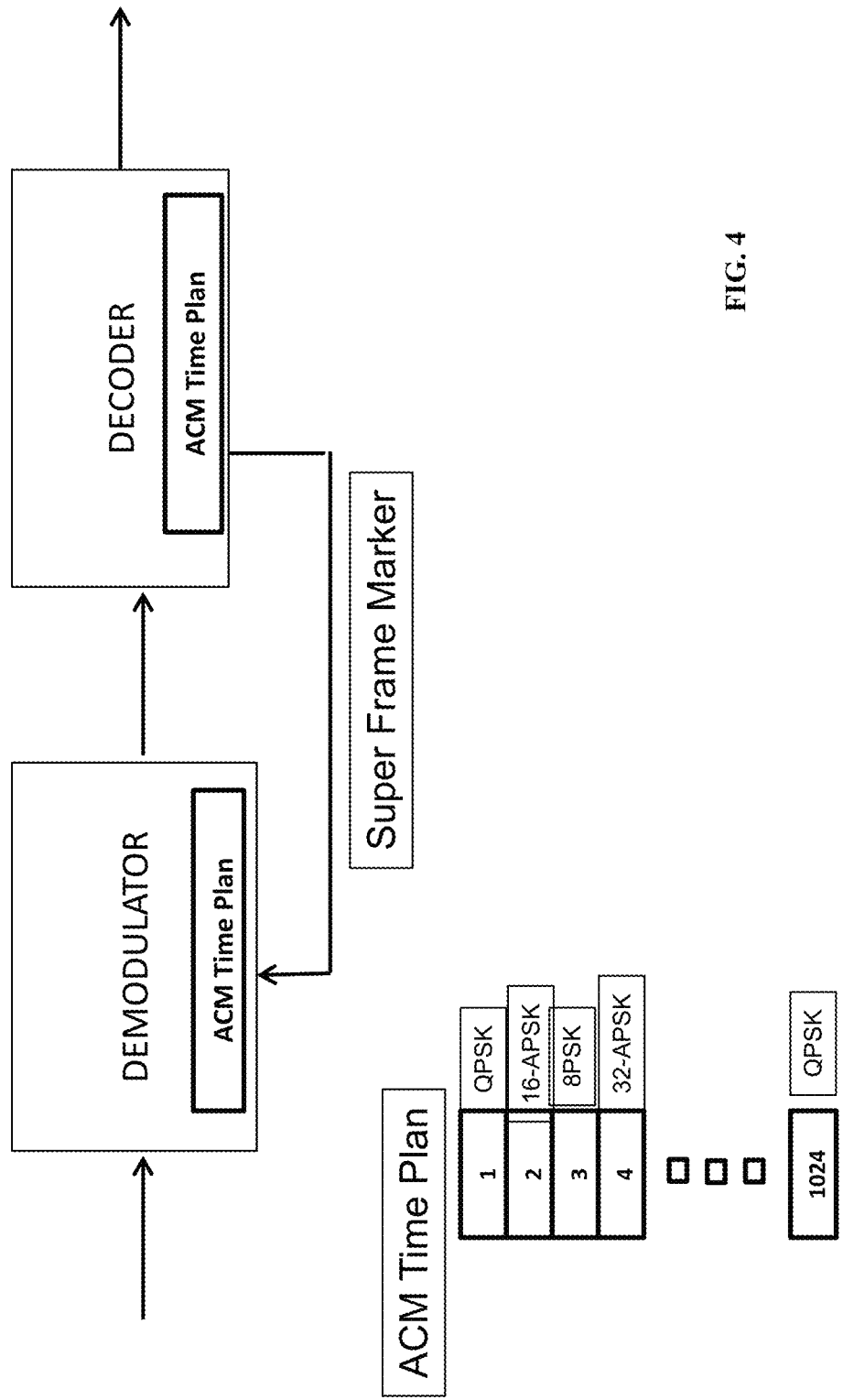
FIG. 4 illustrates an exemplary view of distributing a time plan at the start of a super frame.

FIG. 4 illustrates an exemplary view of distributing a time plan at the start of a super frame.

ACM follows a fixed time-plan. ACM time plan repeats every SuperFrame. A SuperFrame is set for a fixed number of frames, for example, 1024. A frame time is determined by the modulation type. So a Forward Error Correction (FEC) type can vary within the modulation type from SuperFrame to SuperFrame. A frame number is sent as part of the SSN field of the baseband header of the DVB-S2 frame. At start-up the DVB-S2 decoder establishes synchronization and determines the SuperFrame boundary. The SuperFrame boundary is determined using the decoded SSN frame number. For example, a terminal decoder can locate the SuperFrame marker using this method to drop frames that are not intended for a group of terminals.

According to various embodiments, the SuperFrame boundary marker can be provided or made available to a Unique Word Processor (UWP) of a DVB-S2 demodulator. With the boundary marker, a time plan for the SuperFrame can be available to the DVB-S2 demodulator.

Figure 5:
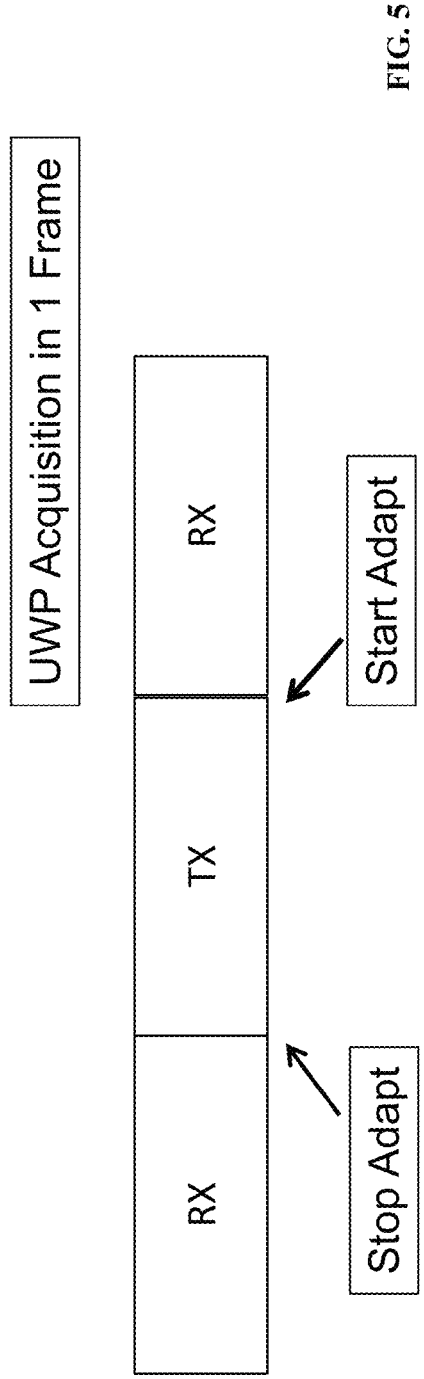
FIG. 5 illustrates an exemplary view of reacquisition of a continuous received stream, according to various embodiments.

FIG. 5 illustrates an exemplary view of reacquisition of a continuous received stream, according to various embodiments.

Figure 6:
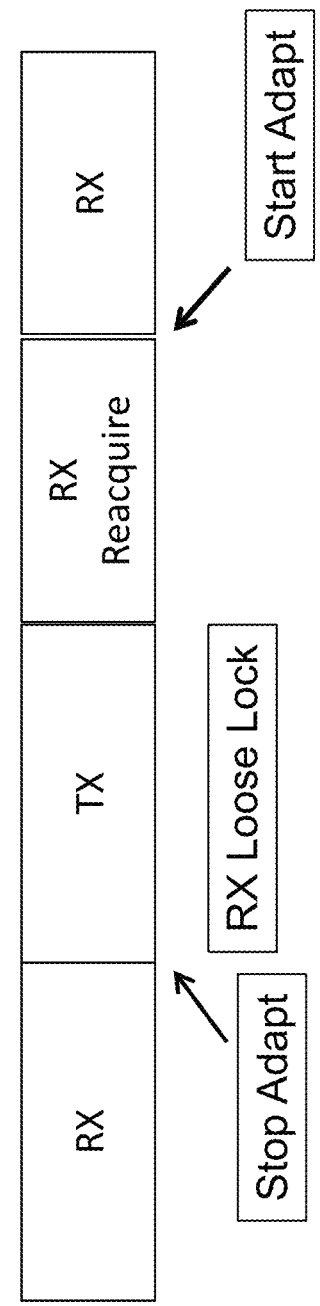
FIG. 6 illustrates an exemplary view of reacquisition of a continuous received stream, according to various embodiments.

FIG. 6 illustrates an exemplary view of reacquisition of a continuous received stream, according to various embodiments.

The UWP in the demodulator is able to determine the location of frames using the SuperFrame marker, and the ACM Time Plan is made available to both the demodulator and the decoder. With the ACM Time plan, the ACM UWP can operate similar to a CCM UWP. The demodulator is setup or programmed to freewheel during an outage of an RX signal. In exemplary embodiments, the demodulator can maintain lock status during a TX operation. In exemplary embodiments, the demodulator can reacquire the RX signal within one (1) frame as the location of the next unique word is known from the SuperFrame marker and fixed ACM Time Plan.

Although the subject matter has been described in language specific to structural features and/or methodological acts, it is to be understood that the subject matter in the appended claims is not necessarily limited to the specific features or acts described above. Rather, the specific features and acts described above are disclosed as example forms (not exemplary embodiments??) for implementing the claims.

Although the above descriptions may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

We claim as our invention:

1. A method for providing half-duplex communications for a Very Small Aperture Terminal (VSAT) operating on a continuous received stream, the method comprising:

decoding the continuous received stream to establish synchronization with the continuous received stream;

locating, in the continuous received stream, a time plan comprising a receiving timeslot and a transmitting timeslot;

demodulating the continuous received stream by adapting to a timing and frequency variation of the continuous received stream in the receiving timeslot, freewheeling the adapting of the continuous received stream during the transmitting timeslot, and resuming the adapting of the continuous received stream when the transmitting timeslot ends;

stopping a receiving of the continuous received stream during the transmitting timeslot; and transmitting from the VSAT during the transmitting timeslot, wherein the freewheeling comprises saving a signal acquisition parameter at the start of the transmitting timeslot and restoring the saved signal acquisition parameter at the end of the transmitting timeslot.

2. The method of claim 1, wherein the continuous received stream comprises a Constant Coding and Modulation (CCM) stream comprising a super frame comprising frames and slots, a Stream Sequence Number (SSN) field of a baseband header, a time plan for the frames and slots, and a modulation scheme for the continuous received stream, and wherein the receiving and transmitting timeslots each comprise a frame and a slot of the frames and slots of the super frame, and the receiving frame and slot is different than the transmitting frame and slot.

3. The method of claim 1, wherein the continuous received stream comprises a Adjustable Coding and Modulation (ACM) stream comprising a super frame comprising frames and slots, a Stream Sequence Number (SSN) field of a baseband header, a time plan for the frames and slots, and a modulation scheme for the frames continuous received of the stream, and wherein the receiving and transmitting timeslots each comprise a frame and a slot of the frames and slots of the super frame, and the receiving frame and slot is different than the transmitting frame and slot.

4. The method of claim 1, further comprising:
transmitting, from the VSAT, a request for allocating the transmitting timeslot; and
receiving, at the VSAT, an allocation comprising the transmitting timeslot over the continuous received stream.

5. The method of claim 4, wherein the request comprises a terminal identifier and a modulation scheme.

6. The method of claim 4, wherein the time plan comprises an unscheduled open transmission time, and the VSAT transmits the request during the unscheduled open transmission time.

7. The method of claim 4, wherein the time plan comprises a system message transmission time, and the VSAT is in receive mode during the system message transmission time.

8. The method of claim 4, wherein the continuous received stream is transmitted by a gateway providing bandwidth allocation and time plan generation based on the request.

9. The method of claim 8, wherein the bandwidth allocation and time plan generation at the gateway does not schedule data for receipt by the VSAT during the transmitting timeslot.

10. The method of claim 1, wherein the signal acquisition parameter comprises one or more of Automatic Gain Control (AGC), amplitude and phase imbalance, equalizer coefficients, and reference oscillator correction.

11. An apparatus to provide half-duplex communications for a Very Small Aperture Terminal (VSAT) operating on a continuous received stream, the apparatus comprising:
a decoder configured to decode the continuous received stream to establish synchronization with the continuous received stream, and configured to locate, in the continuous received stream, a time plan comprising a receiving timeslot and a transmitting timeslot;
a demodulator configured to demodulate the continuous received stream by adapting to a timing and frequency variation of the continuous received stream in the receiving timeslot, freewheeling the adapting of the continuous received stream during the transmitting timeslot, and resuming the adapting of the continuous received stream when the transmitting timeslot ends;
a receiver configured to stop receiving the continuous received stream during the transmitting timeslot; and
a transmitter configured to transmit from the VSAT during the transmitting timeslot,
wherein the freewheeling comprises saving a signal acquisition parameter at the start of the transmitting timeslot and restoring the saved signal acquisition parameter at the end of the transmitting timeslot.

12. The apparatus of claim 11, wherein the continuous received stream comprises a Constant Coding and Modulation (CCM) stream comprising a super frame comprising frames and slots, a Stream Sequence Number (SSN) field of a baseband header, a time plan for the frames and slots, and a modulation scheme for the continuous received stream, and wherein the receiving and transmitting timeslots each comprise a frame and a slot of the frames and slots of the super frame, and the receiving frame and slot is different than the transmitting frame and slot.

13. The apparatus of claim 11, wherein the continuous received stream comprises a Adjustable Coding and Modulation (ACM) stream comprising a super frame comprising frames and slots, a Stream Sequence Number (SSN) field of a baseband header, a time plan for the frames and slots, and a modulation scheme for the frames continuous received of the stream, and wherein the receiving and transmitting timeslots each comprise a frame and a slot of the frames and slots of the super frame, and the receiving frame and slot is different than the transmitting frame and slot.

14. The apparatus of claim 11, wherein the transmitter transmits a request for allocating the transmitting timeslot, and the receiver receives an allocation comprising the transmitting timeslot over the continuous received stream.

15. The apparatus of claim 14, wherein the request comprises a terminal identifier and a modulation scheme.

16. The apparatus of claim 14, wherein the time plan comprises an unscheduled open transmission time, and the VSAT transmits the request during the unscheduled open transmission time.

17. The apparatus of claim 14, wherein the time plan comprises a system message transmission time, and the VSAT is in receive mode during the system message transmission time.

18. The apparatus of claim 14, wherein the continuous received stream is transmitted by a gateway providing bandwidth allocation and time plan generation based on the request.

19. The apparatus of claim 18, wherein the bandwidth allocation and time plan generation at the gateway does not schedule data for receipt by the VSAT during the transmitting timeslot.

20. The apparatus of claim 11, wherein the signal acquisition parameter comprises one or more of Automatic Gain Control (AGC), amplitude and phase imbalance, equalizer coefficients, and reference oscillator correction.

21. A method for receiving half-duplex communications from a Very Small Aperture Terminal (VSAT) operating on a continuous received stream, the method comprising:
receiving, from the VSAT, a request for allocating a transmitting timeslot, wherein the request comprises a priority and a modulation scheme;
allocating bandwidth based on the request with an allocation comprising the transmitting timeslot, wherein the allocating assigns the transmitting timeslot based on the priority and the modulation scheme of the request and adds the transmitting timeslot to a blacklist;

generating a time plan based on the priority, modulation scheme and blacklist;
transmitting the allocation to the VSAT; and
transmitting the time plan to the VSAT,
wherein the time plan comprises a transmitting timeslot and an associated modulation for the VSAT, and a receiving timeslot for the VSAT, and
the allocating does not schedule data for receipt by the VSAT during the transmitting timeslot.

22. The method of claim 21, further comprising:
decoding a transmission from the VSAT during the transmitting timeslot of the time plan;
demodulating a transmission from the VSAT based on the transmitting timeslot and the associated modulation of the time plan; and
stopping a receiving of the transmission at an end of the transmitting timeslot.

23. The method of claim 21, wherein the continuous received stream comprises a Constant Coding and Modulation (CCM) stream comprising a super frame comprising frames and slots, a Stream Sequence Number (SSN) field of a baseband header, a time plan for the frames and slots, and a modulation scheme for the continuous received stream, and
wherein the receiving and transmitting timeslots each comprise a frame and a slot of the frames and slots of the super frame, and the receiving frame and slot is different than the transmitting frame and slot.

24. The method of claim 21, wherein the continuous received stream comprises a Adjustable Coding and Modulation (ACM) stream comprising a super frame comprising frames and slots, a Stream Sequence Number (SSN) field of a baseband header, a time plan for the frames and slots, and a modulation scheme for the frames continuous received of the stream, and
wherein the receiving and transmitting timeslots each comprise a frame and a slot of the frames and slots of the super frame, and the receiving frame and slot is different than the transmitting frame and slot.

25. The method of claim 21, wherein the request comprises a terminal identifier.

26. The method of claim 21, wherein the time plan comprises an unscheduled open transmission time, and the VSAT transmits the request during the unscheduled open transmission time.

27. The method of claim 21, wherein the time plan comprises a system message transmission time, and the VSAT is in receive mode during the system message transmission time.

28. A gateway for receiving half-duplex communications from a Very Small Aperture Terminal (VSAT) operating on a continuous received stream, the gateway comprising:
a receiver configured to receive, from the VSAT, a request for allocating a transmitting timeslot, wherein the request comprises a priority and a modulation scheme;
a bandwidth allocator configured to allocate bandwidth based on the request with an allocation comprising the transmitting timeslot, wherein the bandwidth allocator assigns the transmitting timeslot based on the priority and the modulation scheme of the request to generate a time plan; and
a transmitter configured to transmit the allocation and the time plan to the VSAT,
wherein the time plan comprises a transmitting timeslot and an associated modulation for the VSAT, and a receiving timeslot for the VSAT, and
the bandwidth allocator does not schedule data for receipt by the VSAT during the transmitting timeslot.

29. The gateway of claim 28, further comprising:
a decoder configured to decode a transmission from the VSAT during the transmitting timeslot of the time plan; and
a decoder configured to demodulate a transmission from the VSAT based on the transmitting timeslot and the associated modulation of the time plan,
wherein the receiver stops receiving of the transmission at an end of the transmitting timeslot.

30. The gateway of claim 28, wherein the continuous received stream comprises a Constant Coding and Modulation (CCM) stream comprising a super frame comprising frames and slots, a Stream Sequence Number (SSN) field of a baseband header, a time plan for the frames and slots, and a modulation scheme for the continuous received stream, and
wherein the receiving and transmitting timeslots each comprise a frame and a slot of the frames and slots of the super frame, and the receiving frame and slot is different than the transmitting frame and slot.

31. The gateway of claim 28, wherein the continuous received stream comprises a Adjustable Coding and Modulation (ACM) stream comprising a super frame comprising frames and slots, a Stream Sequence Number (SSN) field of a baseband header, a time plan for the frames and slots, and a modulation scheme for the frames continuous received of the stream, and
wherein the receiving and transmitting timeslots each comprise a frame and a slot of the frames and slots of the super frame, and the receiving frame and slot is different than the transmitting frame and slot.

32. The gateway of claim 28, wherein the request comprises a terminal identifier.

33. The gateway of claim 28, wherein the time plan comprises an unscheduled open transmission time, and the VSAT transmits the request during the unscheduled open transmission time.

34. The gateway of claim 28, wherein the time plan comprises a system message transmission time, and the VSAT is in receive mode during the system message transmission time.

* * * * *